LIGHT AMPLIFIER AND STORAGE DEVICE

Filed May 29, 1958

INVENTORS
EGON E. LOEBNER &
DONALD C. DARLING
BY
William A. Zalesak
ATTORNEY

United States Patent Office 2,972,054
Patented Feb. 14, 1961

2,972,054

LIGHT AMPLIFIER AND STORAGE DEVICE

Egon E. Loebner, Princeton, N.J., and Donald C. Darling, Levittown, Pa., assignors to Radio Corporation of America, a corporation of Delaware Filed May 29, 1958, Ser. No. 738,870

8 Claims. (Cl. 250—213)

Figure 1:
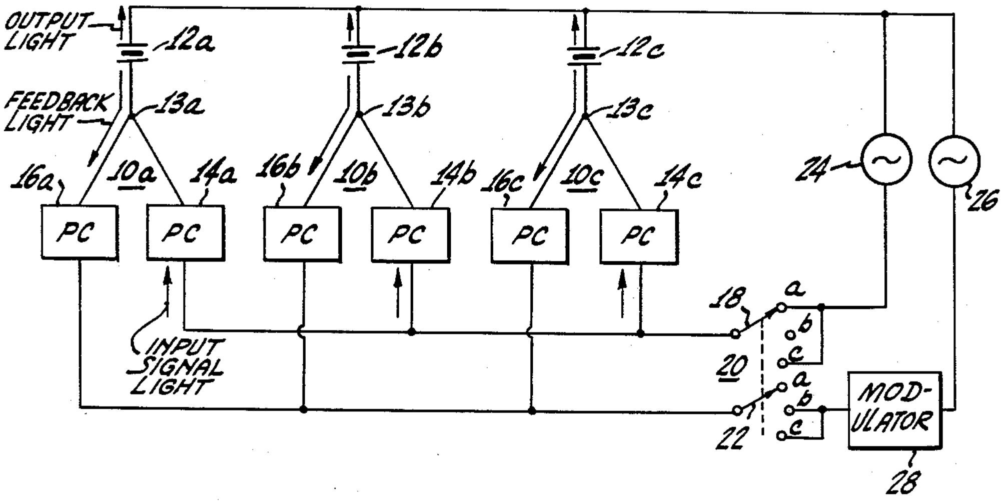

Our invention relates to information display devices utilizing electroluminescence and particularly to improvements in devices designed to amplify and store light signal information for an extended time.

Light amplifying devices of the kind employing serially connected electroluminescent and photoconductive elements are known. Some of these devices are specifically designed to operate solely as light amplifiers without storage, whereas others are designed with optical feedback so that the displayed light pattern information may be stored, and viewed for an extended time. However, in some applications it is desired to have a single device which can perform the various functions of light amplification with (1) no storage, (2) storage of a given time-selected signal pattern only, or (3) storage of all signals as they are being received. It is also desired to be able to immediately switch from any one of the above conditions to any of the other ones with a minimum of adjustment in operating conditions.

A principal object of our invention is to provide a device which can selectively perform the functions of light amplification with or without storage, with a minimum of operating adjustment.

A further object is to provide a device which can (1) amplify light signals without storage, (2) store given light signal patterns and only those signal patterns, selected at the time they were received, and (3) store all light signals as they are received.

The above and other objects are achieved in accordance with one embodiment of this invention by the provision of an electroluminescent cell having one terminal connected to two electrical branches, each of which includes a photoconductive cell. Switch means are included in the circuit with the electroluminescent and photoconductive cells so that either one of the branches or both branches in parallel with each other can be selectively connected in series with the other terminal of the electroluminescent cell. The photoconductive cell in one of the branches is arranged to receive external or signal light but is shielded from the light emitted by the electroluminescent cell. The photoconductive cell in the other branch is shielded from signal light but is arranged to receive light emitted from the electroluminescent cell. When the circuit branch including the electroluminescent cell and the signal-responsive photoconductive cell in electrical connection only is energized, the device functions as a light amplifier. That is, there is no optical feedback or storage during this mode of operation since the electroluminescent cell and the photoconductive cell are optically insulated. When the second circuit branch, which includes the electroluminescent cell in electrical and optical feedback relation with the second photoconductive cell, is energized, the device acts to store the signal registered at the time of energization. Activating the second circuit branch alone provides storage only of those signals received immediately prior to the time of such activation, and no new light signal patterns will be registered after such activation.

When both circuit branches are closed simultaneously, the device will receive and also store all input light signals.

Figure 2:
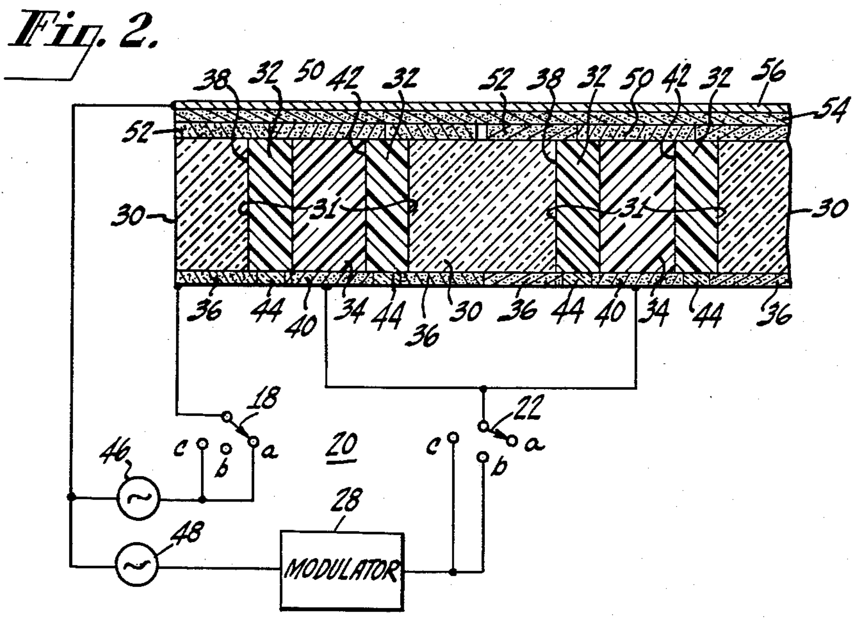

In the drawings:

Fig. 1 is a schematic representation of one line of elements embodying the invention; and Fig. 2 is a partial cross-sectional cutaway view, showing a panel incorporating the invention.

Fig. 1 shows schematically a linear array of light amplifier and storage units, three of which **10*a*, 10*b* and 10*c* are shown, although many more will ordinarily be used. Each unit includes an electroluminescent cell 12*a*, 12*b* and 12*c* connected to a junction 13*a*, 13*b* and 13*c* of two branches, each of which includes a photoconductive cell. The photoconductive cells 14*a*, 14*b* and 14*c* in one branch are exposed to external or signal light and are shielded from the light emitted by the electroluminescent cells 12*a*, 12*b* and 12*c*, whereas the photoconductive cells 16*a*, 16*b* and 16*c* in the other branch are exposed to light from the electroluminescent cells 12*a*, 12*b* and 12*c* but are shielded from external light. All the photoconductive cells 14*a*, 14*b* and 14*c* which are exposed to external light are connected to one pole 18 of a double pole multiple position switch 20. Similarly, all the feedback photoconductive cells 16*a*, 16*b* and 16*c*, that is, those which are exposed to light from the electroluminescent cells 12*a*, 12*b* and 12*c* are connected to the other pole 22 of the switch. Alternating current voltage sources 24 and 26 are connected between the electroluminescent cells 12*a*, 12*b* and 12*c* and the terminals of the switch 20, so that upon proper switching each source can be connected into the circuit with its respective branch, in a manner to be described more fully. The sources 24 and 26** may operate at the same or different voltage and frequency, but generally they should be very similar in these respects.

Associated with the source 26 in series with the feedback photoconductive cells 14 may be a feedback modulator 28. The feedback modulator 28, to be more fully described, may be a pulse shaping network which changes the sine wave output of the A.C. source 26 to one which is a series of pulses of desired time duration and repetition rate.

In operation, assume that the switch 20 is closed on contacts *a* as shown. In this position, the source 24 is in series with the photoconductive cells **14*a*, 14*b* and 14*c* which receive input light, and the source 26 is disconnected from the feedback branch, or photoconductive cells 16*a*, 16*b* and 16*c*. The input branch cells 14*a*, 14*b* and 14*c* thus combine with the electroluminescent cells 12*a*, 12*b* and 12*c* to operate as light amplifiers without storage, so that a light signal input to the input photoconductive cells 14*a*, 14*b* and 14*c* results in a corresponding output in the electroluminescent cells 12*a*, 12*b* and 12*c*. Output light persists only so long as the input light remains and ceases when the input light is removed. Some of the output light is fed back to the feedback photoconductive cells 16*a*, 16*b* and 16*c*, but when switch 20** is in position *a* these cells **16*a*, 16*b* and 16*c*** have no effect because they are open circuited.

If there is a visible signal in a given unit **10*b* for example, that is desired to be closely scrutinized, the switch 20** is moved to position *b*. In switch position *b*, source 26 is connected into the feedback branch and source 24 is disconnected. It will be understood that the steps of connecting source 26 and disconnecting source 24 may in fact be separated in time to compensate for differences in the photocurrent build up in the feedback branch and the photocurrent decay in the input branch. However, any time difference will probably be small, and for purposes of explanation it will be assumed that the events take place simultaneously. The feedback photoconductive cell 16*b* in unit 10*b* was made conductive by receiving part of the output light from the electroluminescent cell 12*b* in that unit, and therefore conducts as soon as voltage is applied. The cell 16*b* is now sufficiently conductive to maintain the electroluminescent cell 12*b* in a luminescent state, so that the signal last received, and only that signal, is stored. Any new signals transmitted to the input cells 14 are not visible since the input cells 14*a*, 14*b* and 14*c* are now open circuited. In a sense, the device can be thought of as a light signal filter as to new signals when operated in this manner.

Assume that it is desired to view all new signals and to store them as they are received. The switch 20 is moved to position *c*, whereupon both electrical branches of each unit and both sources of voltage 24 and 26 are connected. Input light signals on the input photoconductive cells 14*a*, 14*b* and 14*c* result in corresponding light output signals from the electroluminescent cells 12*a*, 12*b* and 12*c*. Since the feedback photoconductive cells 16*a*, 16*b* and 16*c* are in the circuit, they continue to conduct current in their respective units even after the input light signals no longer illuminate the respective units, thus maintaining the electroluminescent cells 12*a*, 12*b* and 12*c* in a luminescent state. In position *c*, the device can be thought of as an integrating storage light amplifier. As such, it can record and trace the movement of a moving target, for instance.

Preferably, the voltage sources 24 and 26 are operated in phase in position *c* so that in-phase currents from each source flow through the electroluminescent cells 12*a*, 12*b* and 12*c*, rather than out of phase currents which tend to cancel each other. Although the device may be designed to operate satisfactorily without the feedback modulator 28, some advantage can result from its use, particularly in an array designed for displaying half tone images. In the absence of the modulator 28, for instance, a storage unit is driven into saturation at a certain rate. The faster this rate, the sooner half tones are lost from the intensified image. To preserve the half tones, the power from voltage source 26 is applied through modulator 28 so that the feedback photoconductive cells 16*a*, 16*b* and 16*c* are conducting only where power pulses are received through the modulator 28. In the absence of the modulator pulses, the light production ceases, and the feedback branch photoconductive cells 16*a*, 16*b* and 16*c* are permitted to deactivate. Since the deactivation rate increases with the increasing level of previous activation, as is characteristic of photoconductors, and since the rate of saturation is higher for cases where the initial rate of activation is high, the high light level areas of a picture tend not only to saturate faster, but also to deactivate faster than the low light level areas if the power is time shared. This means that the pulsing operation will substantially slow down the loss of half tones during the holding of the picture. Depending on the on-off time share ratio, the picture can decay at various rates or saturate into a two-tone picture at various rates.

For displaying picture information in two dimensions, a panel is made up of an array of many lines of the units shown schematically in Fig. 1. The panel shown in Fig. 2 comprises a transparent glass plate 30 formed with a multiplicity of apertures 31 which contain hollow tubular photoconductive plugs 32. The interiors of the plugs 32 are filled with members 34 of transparent insulating material such as a plastic. One side of the plate 30 is coated with a transparent conductive apertured layer 36 in contact with the ends of the outside surfaces 38 of the photoconductive plugs 32. The conductive layer 36 is provided with openings registering with the ends of the plugs 32. Received within these openings, and in contact with the ends of the plugs 32 and completely covering the exposed ends of the insulating members 34 are opaque conductive elements 40 electrically insulated from the conductive layer 36 by means of insulating rings 44. The conductive apertured layer 36 is connected to one side of a voltage source 46 and the elements 40 are connected together and to one side of a second voltage source 48. On the other side of the plate 30 there is provided a mosaic of conductive elements comprising transparent inner conductive patches 50 in contact with the ends of the inside surfaces 42 of the photoconductive plugs 32, and opaque outer conductive rings 52 in contact with the ends of the outside surfaces 38 of the plugs 32. An electroluminescent phosphor layer 54 covers the conductive mosaic. The phosphor layer 54 is coated with a transparent conductive layer 56 which is connected to the other sides of the voltage sources 46 and 48.

As illustrated in Fig. 2, the inside surfaces 42 of the photoconductive plugs 32 are shielded from incident input light by the opaque patches 40 but can receive electroluminescent light through the transparent conductive patches 50 and the transparent members 34. These inside surfaces 42 correspond to the feedback photoconductive cells 16*a*, 16*b* and 16*c* in Fig. 1. On the other hand, the outside surfaces 38 of the plugs 32 are able to receive incident input light through the transparent conductive layer 36 and the transparent plate 30 but are shielded from the electroluminescent light by the opaque conductive rings 52. The outside photoconductive surfaces 38 thus correspond to the input photoconductive cells 14*a*, 14*b* and 14*c* of Fig. 1.

The photoconductive plugs 32 preferably comprise cadmium sulfide or cadmium selenide photoconductive powder mixed with a suitable insulating plastic such as an epoxy resin. The electroluminescent phosphor layer 54 may comprise any well known phosphor, such as copper activated zinc sulfide, embedded in a suitable dielectric matrix. The wall thickness of the photoconductive plugs 32 is made suitably thick, for example, .010 inch, so that the inside and outside surfaces of the photoconductive plugs 32 conduct only laterally and independently of each other.

The operation of the device of Fig. 2 is similar to the operation described in connection with the schematic of Fig. 1.

With reference to Fig. 1, it is noted that sneak current paths may exist in a given line of units which would tend to excite normally "off" units. These sneak current paths, or "cross talk," are due to the presence of all the pairs of normally excited photoconductors which appear in shunt across the poles 18 and 22 of the switch 20. Cross-talk effects tending to excite normally-off electroluminescent cells may be minimized by selecting a photoconductive material which has a non-linear current-voltage relation. The plastic bonded photoconductors referred to above have such a characteristic. The non-linear photoconductive characteristics of plastic bonded cadmium sulfide powder is discussed in an article by B. Kazan and F. H. Nicoll, entitled "An Electroluminescent Light Amplifying Picture Panel," in the December 1955 issue of Proceedings of the IRE, page 1892.

The invention described herein provides means whereby light signals may be amplified without storage, or a given light signal and only that signal can be stored at the time it is received, or all light signals may be stored as they are received. Furthermore, the invention provides a device wherein any of the above operating conditions are easily selected by switching means.

What is claimed is:

1. An electroluminescent device comprising an electroluminescent cell and two photoconductive cells, and means including a switch for selectively connecting said electroluminescent cell in series with either one of said photoconductive cells, means for exposing one of said photoconductive cells to external incident light and shielding said one of said photoconductive cells to light emitted by said electroluminescent cell, means for exposing the other of said photoconductive cells to light from said electroluminescent cell and shielding said other of said photoconductive cells from external incident light.

2. An electroluminescent device comprising an electroluminescent cell and two photoconductive cells, and means including a switch for selectively connecting a voltage source in series circuit with said electroluminescent cell and either one of said photoconductive cells, means for exposing one of said photoconductive cells to external incident light means for shielding said one of said photoconductive cells to light emitted by said electroluminescent cell, means for exposing the other of said photoconductive cells to receive light from said electroluminescent cell, means for shielding said other of said photoconductive cells from external incident light, whereby in the switch position connecting said one photoconductive cell in circuit a light signal incident on said one photoconductive cell is amplified by said device and when said switch is changed from said position to the switch position connecting said other photoconductive cell in circuit said signal is stored.

3. An electroluminescent device comprising an electroluminescent cell connected to the junction of two branches, one of said branches including a photoconductive cell which is exposed to external light but which is shielded from light from said electroluminescent cell, the other branch including a photoconductive cell which is in optical feedback relation with said electroluminescent cell but which is shielded from external light, a pair of voltage sources both connected to one side of said electroluminescent cell, and means including a switch for selectively connecting each of said pair of sources to a respective branch, said switch means being operable to connect said branches separately or together.

4. The invention as in claim 3 wherein said sources are in phase.

5. An electroluminescent device comprising an electroluminescent cell connected to the junction of two branches, one of said branches including a photoconductive cell which is exposed to external light but is shielded from light from said electroluminescent cell, the other branch including a photoconductive cell which is in light feed-back relation with said electroluminescent cell but which is shielded from said external light, a pair of voltage sources connected to one side of said electroluminescent cell, means including a switch for selectively connecting each source to a respective branch, said switch means being operable to connect said branches separately or together, and a modulator in said other branch operable to vary the output of said source connected in said other branch.

6. An electroluminescent device comprising an array of units connected in parallel, each including an electroluminescent cell and two photoconductive cells, and means including a switch for selectively connecting the electroluminescent cell of each unit in series with either one of the photoconductive cells or to both photoconductive cells in parallel with each other in the respective unit, means for exposing one of said two photoconductive cells to external incident light and shielding said one of said cells from light emitted by said electroluminescent cell, means for exposing the other of said photoconductive cells to light from said electroluminescent cell and shielding said other of said cells from external incident light.

7. An electroluminescent device comprising an electroluminescent layer and a plurality of pairs of photoconductive cells, each pair of cells being defined by a tubular element having internal and external surfaces, conductive means connecting said surfaces to said electroluminescent layer at one end of each element, first conductive means connected to said internal surfaces at the other end of each element, second conductive means connected to said external surfaces at said other end of each element, said first and said second conductive means being electrically insulated from each other, and a pair of electrical terminals each connected to a different one of said insulated conductive means.

8. An electroluminescent device comprising an electroluminescent layer and a plurality of tubular photoconductive elements supported upright with respect to and conductively connected at one end to said layer, each photoconductive element having internal and external surfaces, one of said surfaces exposed to external light but shielded from light emitted by said electroluminescent layer, and the other surface exposed to said light from said electroluminescent layer but shielded from external incident light, and mutually insulated conductive means connected separately to said surfaces at the other end of each element.

References Cited in the file of this patent

UNITED STATES PATENTS

| | | |
|---|---|---|
| 2,773,992 | Ullery | Dec. 11, 1956 |
| 2,839,690 | Kazan | June 17, 1958 |
| 2,875,350 | Orthuber et al. | Feb. 24, 1959 |